Patented Feb. 12, 1924.

1,483,447

UNITED STATES PATENT OFFICE.

JOHANN HUISMANN, OF WIESDORF, NEAR COLOGNE-ON-THE-RHINE, GERMANY, ASSIGNOR TO FARBENFABRIKEN VORM. FRIEDR. BAYER AND CO., OF LEVERKUSEN, NEAR COLOGNE-ON-THE-RHINE, GERMANY.

AZO DYESTUFF.

No Drawing.    Application filed March 15, 1923. Serial No. 625,422.

*To all whom it may concern:*

Be it known that I, JOHANN HUISMANN, a citizen of Germany, residing at Wiesdorf, near Cologne-on-the-Rhine, in the State of Prussia, Germany, have invented new and useful Improvements in Azo Dyestuff, of which the following is a specification.

I have found that new and valuable azo-dyes for cotton can be obtained by combining the diazo compounds of the sulfonic acids of aromatic aminothiazole compounds, which are described in the United States Letters Patent No. 1,149,582, with the mixed urea compounds obtained on the one hand from the 2-amino-5-naphthol-7-sulfonic acid and its derivatives and on the other hand from the acidylized para-aryldiamines or their derivatives, such as:

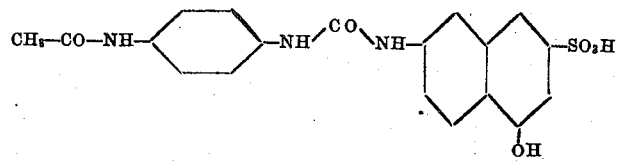

In this formula the radicle of 2-amino-5-naphthol-7-sulfonic acid can be replaced by that of a derivative e. g. 1-chloro-2-amino-5-naphthol-7-sulfonic acid, 2-amino-5-naphthol-1.7-disulfonic acid, and the radicle of the para-aminoacetanilid by a derivative or a homologue thereof, such as para-aminoformanilid, para-amino-oxalylanilid para-aminophenyl urea or others, substituted by chlorin, methyl, oxymethyl etc.

My new dyes are after being dried and pulverized in the shape of their alkali metal salts dark powders soluble in water generally with a red coloration, soluble in concentrated sulfuric acid generally with a violet coloration. Upon treatment with stannous chlorid and hydrochloric acid they are split up into the orthosulfonic acids of aromatic aminothiazole compound described in the United States Letters Patent 1,149,582 and aminoureas containing the radicle of a 2.6-diamino-5-naphthol-7-sulfonic acid compound and the radicle of a para-aryldiamine. The new coloring matters dye cotton pure red shades distinguished by a good fastness to water and a very good fastness to light.

In order to illustrate my invention more fully the following example is given, the parts being by weight:—444 parts of dehydrothiotoluidin disulfonate of sodium (see United States Letters Patent No. 1,149,582) are dissolved in 17500 parts of hot water and are diazotized at about 45° C. with 310 parts of crude hydrochloric acid and 69 parts of sodium nitrite. Subsequently 437 parts of the mixed urea derivative derived from 2-amino-5-naphthol-7-sulfonate of sodium and para-aminoacetanilid are dissolved in about 8000 parts of hot water. There are added to this solution 350 parts of crystallized sodium acetate dissolved in about 1750 parts of water to which 40 parts of crude hydrochloric acid has been added in order to neutralize the alkaline reaction of the acetate. The solution of the urea thus prepared is heated to about 45° C. and added within a short time to the diazo solution, heated to about 45° C. and the resulting mixture is kept at this temperature during some hours. 14000 parts of water are then added, the mixture is heated to about 80 to 90° C. and the dye is salted out with 2500 parts of common salt, filtered off and dried.

It is a dark powder soluble in water with a red coloration, soluble in concentrated sulfuric acid with a violet coloration. Upon treatment with stannous chlorid and hydrochloric acid it is split up into dehydrothiotoluidin disulfonic acid and the urea of 2.6- diamino-5-naphthol-7-sulfonic acid and para-aminoacetanilid. It dyes cotton pure scarlet-red shades fast to light and to water.

The formula of the dye in the free state prepared in accordance with the foregoing example is:

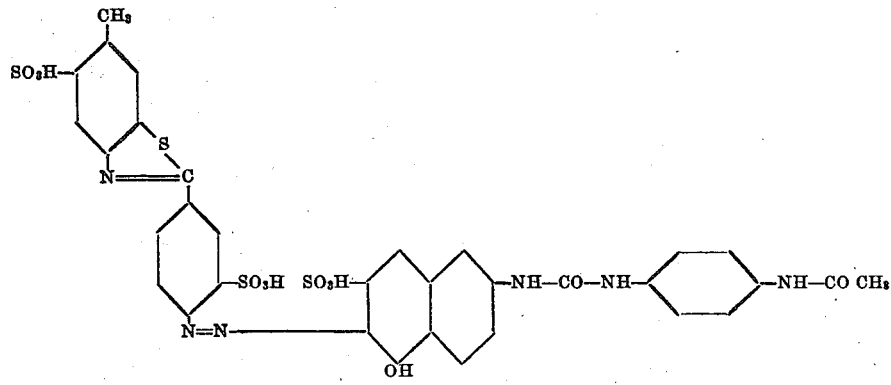

I claim:—

1. The herein described new azodyestuffs which are after being dried and pulverized in the shape of their alkali metal salts dark powders soluble in water generally with a red coloration, soluble in concentrated sulfuric acid generally with a violet coloration; yielding upon reduction with stannous chlorid and hydrochloric acid ortho-sulfonic acids of aromatic amino-thiazole compounds and amino ureas containing the radicle of a 2.6-diamino-5-naphthol-7-sulfonic acid compound and the radicle of a para-aryldiamine; dying cotton pure red shades distinguished by their good fastness to water and light, substantially as described.

2. The herein described new azodyestuff, which is after being dried and pulverized in the shape of its sodium salt a dark powder soluble in water with a red and in concentrated sulfuric acid with a violet coloration; yielding upon reduction with stannous chlorid and hydro-chloric acid dehydrothiotoluidin disulfonic acid and the urea of 2.6-diamino-5-naphthol-7-sulfonic acid and para-aminoacetanilid; dyeing cotton pure scarlet-red shades fast to water and to light. substantially as described.

In testimony whereof I have hereunto set my hand.

JOHANN HUISMANN.